United States Patent
Beals

(10) Patent No.: US 9,980,142 B2
(45) Date of Patent: May 22, 2018

(54) METHODS AND APPARATUS FOR SIM-BASED AUTHENTICATION OF NON-SIM DEVICES

(71) Applicant: Google Inc., Mountain View, CA (US)

(72) Inventor: Travis Roland Beals, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/077,597

(22) Filed: Mar. 22, 2016

(65) Prior Publication Data

US 2017/0280324 A1 Sep. 28, 2017

(51) Int. Cl.
  *H04W 12/08* (2009.01)
  *H04M 3/42* (2006.01)
  *H04W 12/06* (2009.01)
  *H04W 48/08* (2009.01)

(52) U.S. Cl.
  CPC ....... *H04W 12/08* (2013.01); *H04M 3/42153* (2013.01); *H04W 12/06* (2013.01); *H04W 48/08* (2013.01)

(58) Field of Classification Search
  CPC ..... H04W 12/08; H04W 48/08; H04W 12/06; H04M 3/42153
  See application file for complete search history.

(56) References Cited

U.S. PATENT DOCUMENTS

| | | | |
|---|---|---|---|
| 6,381,315 B1 | 4/2002 | Nhaissi | |
| 7,180,898 B2 | 2/2007 | Yoshida et al. | |
| 7,433,929 B2 | 10/2008 | Guilford et al. | |
| 7,809,360 B2 | 10/2010 | Agrawal et al. | |
| 8,265,599 B2 * | 9/2012 | Zohar | H04L 63/0884 455/411 |
| 8,391,192 B2 | 5/2013 | Prakash et al. | |
| 8,484,568 B2 | 7/2013 | Rados et al. | |
| 8,590,023 B2 | 11/2013 | Gupta et al. | |
| 2002/0169716 A1 | 11/2002 | Johnson et al. | |
| 2004/0246920 A1 | 12/2004 | Savolainen | |
| 2007/0037550 A1 | 2/2007 | Armstrong | |
| 2007/0147317 A1 | 6/2007 | Smith et al. | |
| 2008/0009279 A1 | 1/2008 | Sakawa | |
| 2008/0107051 A1 | 5/2008 | Chen et al. | |

(Continued)

FOREIGN PATENT DOCUMENTS

| | | |
|---|---|---|
| EP | 1885144 A2 | 2/2008 |
| EP | 2244501 A1 | 10/2010 |

(Continued)

OTHER PUBLICATIONS

Sensorly, "With Sensorly you can . . . " www.sensorly.com, accessed Apr. 21, 2016.

(Continued)

*Primary Examiner* — Brandon J Miller
(74) *Attorney, Agent, or Firm* — Faegre Baker Daniels LLP

(57) ABSTRACT

Methods and apparatus presented herein allow a non-SIM device to access a paid Wi-Fi network by having a server emulate the non-SIM device as a related SIM-enabled device to a mobile operator. The mobile operator is led to believe that the non-SIM device is the related SIM-enabled device, and thereby grants authorization to the non-SIM device to access the paid Wi-Fi network.

20 Claims, 10 Drawing Sheets

(56) References Cited

U.S. PATENT DOCUMENTS

| | | | |
|---|---|---|---|
| 2009/0061862 | A1 | 3/2009 | Alberth, Jr. et al. |
| 2009/0298467 | A1 | 12/2009 | Zohar |
| 2010/0304737 | A1 | 12/2010 | Jain et al. |
| 2011/0096673 | A1 | 4/2011 | Stevenson et al. |
| 2011/0306318 | A1 | 12/2011 | Rodgers et al. |
| 2012/0014271 | A1 | 1/2012 | Damenti |
| 2012/0052914 | A1 | 3/2012 | Yaqub et al. |
| 2012/0094653 | A1 | 4/2012 | Okuda |
| 2012/0195223 | A1 | 8/2012 | Raleigh |
| 2012/0282915 | A1 | 11/2012 | Haynes et al. |
| 2013/0148567 | A1 | 6/2013 | Efrati et al. |
| 2013/0155842 | A1 | 6/2013 | Moore et al. |
| 2013/0203438 | A1 | 8/2013 | Shin |
| 2015/0098393 | A1 | 4/2015 | Tofighbakhsh et al. |
| 2015/0127939 | A1 | 5/2015 | Mazandarany et al. |
| 2015/0141037 | A1 | 5/2015 | Saha et al. |
| 2015/0281198 | A1 | 10/2015 | Lee et al. |
| 2016/0037340 | A1 | 2/2016 | Rayment et al. |
| 2016/0261596 | A1* | 9/2016 | Khello .................. H04W 12/08 |

FOREIGN PATENT DOCUMENTS

| | | | |
|---|---|---|---|
| WO | 2002-041580 | A1 | 5/2002 |
| WO | 2004-047476 | A1 | 6/2004 |
| WO | 2006-005947 | A1 | 1/2006 |
| WO | 2008060464 | A1 | 5/2008 |
| WO | 2011-162688 | A1 | 12/2011 |
| WO | 2014-011094 | A1 | 1/2014 |
| WO | 2015158263 | A1 | 10/2015 |

OTHER PUBLICATIONS

Aptilo Networks, "Innovative Wi-Fi Offload Features," from www.aptilo.com/mobile-data-offloading/innovative-wifi-offload-features, accessed Mar. 22, 2016.
Alcatel-Lucent, "7750 Service Router Mobile Offload," Mar. 2016.
Bircher et al., "An Agent-Based Architecture for Service Discovery and Negotiation in Wireless Networks," University of Bern, Wired/Wireless Internet Comms. (WWIC), Jan. 21, 2004.
Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.
VoLGA Forum, "VoLGA Stage 2 V1.7.0: Voice over LTE via Generic Access," Jun. 14, 2010.
Qualcomm Europe et al., "Text Proposal for UE Measurements for Minimizing Drive Tests," 3GPP TSG-RAN WG2 Meeting #66, R2-093175, May 4-8, 2009.
Qualcomm Europe, "Framework for UE SON Reports," 3GPP TSG RAN WG3 & SA WG5, 55-090017, Jan. 12-13, 2008.
CMCC, "Network Selection for WLAN/3GPP Radio Interworking," 3GPP TSG-RAN WG2 Meeting 81#bis, R2-130973, Apr. 15-19, 2013.
Nikravesh et al., "Mobile Network Performance from User Devices: A Longitudinal, Multidimensional Analysis," Passive and Active Measurement: 15th International Conference, PAM 2014, Mar. 10-11, 2014.
Venkiteswaran, Sriram, "Google Project Fi—New Era for Mobile Technology?", http://blog.mojonetworks.com/google-project-fi-new-era-for-mobile-technology, MojoBlog, May 19, 2015.
Movirtu, "Virtual SIM Platform: Decoupling the identity from the SIM card," from www.movirtu.com/#!worklife-virtual-sim-platform/cuml, accessed Mar. 22, 2016.
Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.
International Search Report and Written Opinion; International Application No. PCT/US2017/023535; dated May 31, 2017.
3gpp: "3GPP TSG SA WG3 Security—SA3#26 3rd Generation Partnership Project; Technical Specification Group Service and System Aspects; 3G Security; Wireless Local Area Network (WLAN) Interworking Security; (Release 6)"; Jan. 1, 2002.
Aptilo Inc.; "EAP-SIM and EAP-AKA authentication for mobile devices"; from https://web.archive.org/web/20160303105429/https://www.aptilo.com/aptilo-eap-sim-authentication-server/eap-sim-ada; Mar. 3, 2016.

\* cited by examiner

| ACCOUNT 302 | NON-SIM DEVICE CERTIFICATE WITH A SIM-ENABLED DEVICE LINK DATA 306 | SIM-ENABLED DEVICE ID DATA 304 | NON-SIM DEVICE ID DATA 308 |
|---|---|---|---|
| ACCOUNT NO. | CERTIFICATE ID | CREDENTIALS, PHONE NUMBER, ETC. | DEVICE ID |
| * | * | * | * |
| * | * | * | * |
| * | * | * | * |

DATABASE 214

FIG. 3

METHODS AND APPARATUS FOR SIM-BASED AUTHENTICATION OF NON-SIM DEVICES

BACKGROUND OF THE DISCLOSURE

A subscriber identity module (SIM) card stores a variety of identification information for a mobile device. The SIM card can exist in either hardware (e.g., an integrated circuit chip) or software (e.g., a virtual SIM) forms. During operation, the mobile device connects to a wireless communication subscriber network, and utilizes the SIM card to obtain authorization to access services from the subscriber network.

In many regions of world, paid Wi-Fi networks are becoming widespread. As such, mobile operators are increasingly allowing data offloading to these Wi-Fi networks. To accomplish this, SIM-based authentication is normally used, which allows a mobile device to access a paid Wi-Fi network by using the credentials stored on the SIM card of the mobile device. SIM-based authentication is convenient because no additional credential-provisioning steps are needed. Further, as the SIM card is tied to an account that is associated with the mobile device, the mobile operators can easily bill the account for any Wi-Fi data usage. Moreover, as the SIM card is tied to an identity of a user of the account, certain legal requirements for Internet access can be satisfied in countries that mandate such requirements.

However, SIM-based authentication only works for SIM-enabled devices (e.g., smartphones with active SIM cards therein). The typical user today will also have many devices without SIM cards (e.g., tablets, laptops, gaming consoles, etc.) that the user would like to use to access paid Wi-Fi services. Accordingly, finding ways to allow these ever-growing number of non-SIM devices to automatically authenticate and connect to paid Wi-Fi networks has become a challenge.

SUMMARY OF THE DISCLOSURE

Briefly, to allow a non-SIM device the ability to access a paid Wi-Fi network, a server emulates the non-SIM device as a related SIM-enabled device to a mobile operator. The mobile operator is led to believe that the non-SIM device is the related SIM-enabled device, and thereby grants authorization to the non-SIM device to access the paid Wi-Fi network. Said in another way, the mobile operator grants the non-SIM device access to the paid Wi-Fi network based on an association with the related SIM-enabled device.

In one example, the server obtains and stores the credentials of the related SIM-enabled device. The server then provisions a digital cryptographic certificate to the non-SIM device. The certificate is linked to the related SIM-enabled device. When the non-SIM device is ready to connect to the paid Wi-Fi network, the non-SIM device presents the certificate to the server for authentication. Based on the authentication, the server determines the related SIM-enabled device, and uses the credentials of the related SIM-enabled device to create emulated messages for the non-SIM device to pass on to the mobile operator. This makes the non-SIM device appear as the related SIM-enabled device. In doing so, the server is able to convince the mobile operator to grant the non-SIM device permission to access and use the services of the paid Wi-Fi network.

In another example, based on the authentication of the certificate, the server determines the association of the non-SIM device with the related SIM-enabled device. The server then transmits the association to the mobile operator. Based on the association, the mobile operator links the non-SIM device to an account associated with the related SIM-enabled device. In this manner, the mobile operator is made aware of the identity of the non-SIM device. The server then transmits messages for the non-SIM device to the mobile operator, and the mobile operator in turn grants the non-SIM device permission to access and use the services of the paid Wi-Fi network.

In one example, a method by a server for SIM-based authentication of a non-SIM device includes receiving an access request to access a Wi-Fi network from the non-SIM device. In response to the access request, the method also includes enabling the non-SIM device to access the Wi-Fi network by emulating an ability of a related SIM-enabled device to access the Wi-Fi network for the non-SIM device as though the non-SIM device was the related SIM-enabled device.

In another example, the method may include receiving a non-SIM device certificate with a SIM-enabled device link from the non-SIM device as part of the access request. Further, the method may include determining an association between identification data of the non-SIM device and identification data of the related SIM-enabled device as part of emulating the ability of the related SIM-enabled device to access the Wi-Fi network for the non-SIM device. Moreover, the determination of the association may involve authenticating the non-SIM device based on the non-SIM device certificate with a SIM-enabled device link, and then determining the related SIM-enabled device in response to the authentication of the non-SIM device certificate with a SIM-enabled device link.

The method may further include creating, by the server, an emulated SIM-operator authentication message for the non-SIM device using credentials of the related SIM-enabled device based on the authenticated non-SIM device certificate with a SIM-enabled device link. The server may communicate the emulated SIM-operator authentication message to a mobile SIM-operator server to make the mobile SIM-operator server believe that it is the related SIM-enabled device that is requesting access to the Wi-Fi network instead of the non-SIM device. Accordingly, the server may receive either an access granted message or an access denied message for the non-SIM device in response to communicating the emulated SIM-operator authentication message. The server may, in turn, communicate either the access granted message or access denied message to an access point of the Wi-Fi network. This enables the non-SIM device to access the Wi-Fi network by either granting the non-SIM device access to the Wi-Fi network based on the access granted message, or alternatively, denying the non-SIM device access to the Wi-Fi network based on the access denied message.

The method may further include receiving, by the server, a phone number associated with the related SIM-enabled device. The phone number may serve as an additional piece of identification data for the related SIM-enabled device. In response to receiving the phone number, the server may generate a verification code associated with the related SIM-enabled device, and communicate the verification code associated to the related SIM-enabled device. Afterward, the server may receive the verification code from the non-SIM device. The purpose of sending and then returning the verification code is to confirm that a sender or user of the phone number associated with the related SIM-enabled device has actual control of the phone number. In response to receiving the verification code, the server may generate the non-SIM device certificate with a SIM-enabled device link, and communicate the non-SIM device certificate with a SIM-enabled device link to the non-SIM device.

The method may further include receiving, by the server, data usage information indicating an amount of data used by the non-SIM device on the Wi-Fi network. The server may create an emulated SIM-operator accounting message for the non-SIM device using the data usage information and the credentials of the related SIM-enabled device based on the authenticated non-SIM device certificate with a SIM-enabled device link. The server may communicate the emulated SIM-operator accounting message to a mobile SIM-operator server to make the mobile SIM-operator server believe that the amount of data was used by the related SIM-enabled device instead of the non-SIM device. Accordingly, in response to receiving the emulated SIM-operator accounting message for the non-SIM device from the server, the mobile SIM-operator server may bill an account associated with the related SIM-enabled device for the amount of data used by the non-SIM device on the Wi-Fi network.

In another example, the method may communicate, by the server, the association between the non-SIM device and the related SIM-enabled device to a mobile SIM-operator server. This allows the mobile SIM-operator to be made aware of the identity of the non-SIM device. Thus, in response to receiving the association, the mobile SIM-operator server may link the non-SIM device to an account associated with the related SIM-enabled device. Afterward, the server may communicate a SIM-operator authentication message for the non-SIM device to the mobile SIM-operator server. As the mobile SIM-operator recognizes the non-SIM device, the server may receive an access granted message in response to communicating the SIM-operator authentication message. The server may then communicate the access granted message to an access point of the Wi-Fi network. This enables the non-SIM device to access the Wi-Fi network by granting the non-SIM device access to the Wi-Fi network based on the access granted message.

The method may further include receiving, by the server, data usage information indicating an amount of data used by the non-SIM device on the Wi-Fi network. The server may communicate a SIM-operator accounting message for the non-SIM device using the data usage information to the mobile SIM-operator server. Again, as the mobile SIM-operator recognizes the non-SIM device, the mobile SIM-operator server may bill the account associated with the related SIM-enabled device for the amount of data used by the non-SIM device on the Wi-Fi network.

In one example, a server is communicatively coupled to a Wi-Fi network. The server includes a processor coupled to a communications unit. The processor is configured to cause the server to receive, via the communications unit, an access request to access a Wi-Fi network from a non-SIM device. In response to the access request, the processor is also configured to cause the server enable the non-SIM device to access the Wi-Fi network by emulating an ability of a related SIM-enabled device to access the Wi-Fi network for the non-SIM device as though the non-SIM device was the SIM-enabled device.

In another example, the server may receive a non-SIM device certificate with a SIM-enabled device link from the non-SIM device as part of the access request. Further, the server may determine an association between identification data of the non-SIM device and identification data of the related SIM-enabled device as part of emulating the ability of the related SIM-enabled device to access the Wi-Fi network for the non-SIM device. Moreover, the determination of the association may involve authenticating the non-SIM device based on the non-SIM device certificate with a SIM-enabled device link, and then determining the related SIM-enabled device in response to the authentication of the non-SIM device certificate with a SIM-enabled device link.

The server may further create an emulated SIM-operator authentication message for the non-SIM device using credentials of the related SIM-enabled device based on the authenticated non-SIM device certificate with a SIM-enabled device link. The server may communicate the emulated SIM-operator authentication message to a mobile SIM-operator server to make the mobile SIM-operator server believe that it is the related SIM-enabled device that is requesting access to the Wi-Fi network instead of the non-SIM device. Accordingly, the server may receive either an access granted message or an access denied message for the non-SIM device in response to communicating the emulated SIM-operator authentication message. The server may, in turn, communicate either the access granted message or access denied message to an access point of the Wi-Fi network. This enables the non-SIM device to access the Wi-Fi network by either granting the non-SIM device access to the Wi-Fi network based on the access granted message, or alternatively, denying the non-SIM device access to the Wi-Fi network based on the access denied message.

The server may further receive a phone number associated with the related SIM-enabled device. The phone number may serve as an additional piece of identification data for the related SIM-enabled device. In response to receiving the phone number, the server may generate a verification code associated with the related SIM-enabled device, and communicate the verification code associated to the related SIM-enabled device. Afterward, the server may receive the verification code from the non-SIM device. The purpose of sending and then returning the verification code is to confirm that a sender or user of the phone number associated with the related SIM-enabled device has actual control of the phone number. In response to receiving the verification code, the server may generate the non-SIM device certificate with a SIM-enabled device link, and communicate the non-SIM device certificate with a SIM-enabled device link to the non-SIM device.

The server may further receive data usage information indicating an amount of data used by the non-SIM device on the Wi-Fi network. The server may create an emulated SIM-operator accounting message for the non-SIM device using the data usage information and the credentials of the related SIM-enabled device based on the authenticated non-SIM device certificate with a SIM-enabled device link. The server may communicate the emulated SIM-operator accounting message to a mobile SIM-operator server to make the mobile SIM-operator server believe that the amount of data was used by the related SIM-enabled device instead of the non-SIM device.

In one example, a method by a server to authenticate a non-SIM device includes receiving an association between the non-SIM device and a related SIM-enabled device from another server. The method also includes the server linking the non-SIM device to an account associated with the related SIM-enabled device based on the received association between the non-SIM device and the related SIM-enabled device. The method further includes the server granting the non-SIM device access to a Wi-Fi network by communicating an access granted message to the another server in response to receiving a SIM-operator authentication message from the another server for the non-SIM device to access the Wi-Fi network. Moreover, the method includes the server billing the account associated with the related SIM-enabled device for an amount of data used by the non-SIM device on the Wi-Fi network in response to receiving a SIM-operator accounting message from the another server for the non-SIM device.

In one example, a server is communicatively coupled to a Wi-Fi network. The server includes means to receive an access request to access a Wi-Fi network from a non-SIM device. In response to the access request, the server includes means to enable the non-SIM device to access the Wi-Fi network by emulating an ability of a related SIM-enabled device to access the Wi-Fi network for the non-SIM device as though the non-SIM device was the related SIM-enabled device.

BRIEF DESCRIPTION OF THE DRAWINGS

The disclosure will be more readily understood in view of the following description when accompanied by the below figures and wherein like reference numerals represent like elements, wherein:

FIG. 3 is one example of a database used to support SIM-based authentication of non-SIM devices in accordance with one example set forth in the disclosure;

DETAILED DESCRIPTION OF EMBODIMENTS

Exemplary embodiments provide a technical solution that addresses the problem of enabling a non-SIM device to access a paid Wi-Fi network by emulating the non-SIM device as a related SIM-enabled device to a mobile operator.

As used herein, a SIM-enabled device includes any mobile device with an active SIM card (e.g., a smartphone, a smartwatch, a wearable device, etc.). A non-SIM device encompasses either a device without an active SIM card or a device that may have a SIM card physically or electrically attached, but the SIM card is non-active or nonoperational (e.g., a tablet, a laptop, a gaming console, etc.). More generally, a non-SIM device may include any suitable device with Wi-Fi capabilities that lacks an active SIM card.

Figure 1:
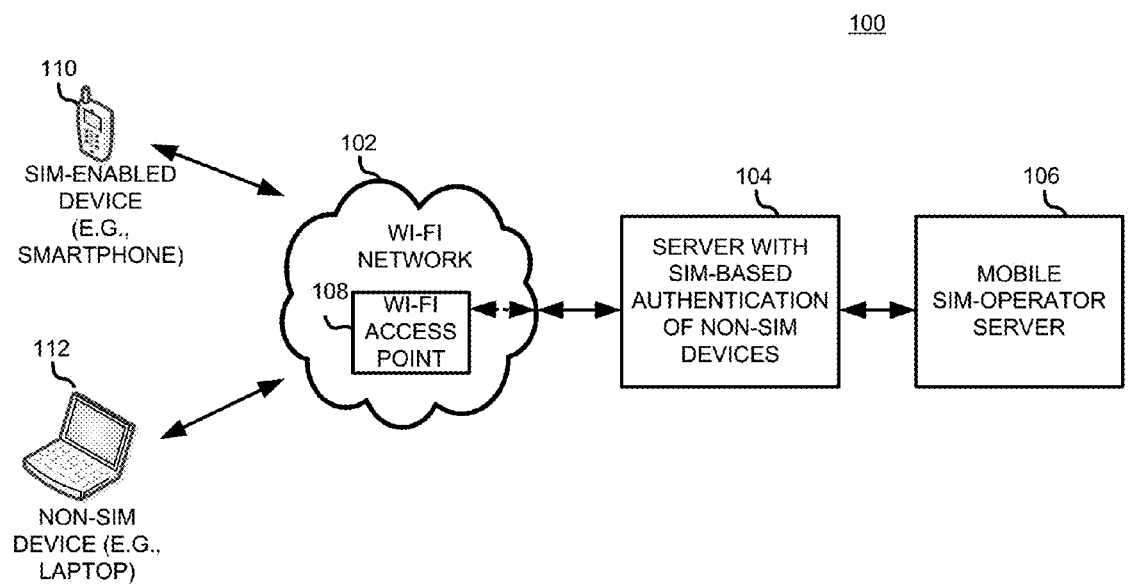
FIG. 1 is a block diagram generally illustrating one example of a communication environment for SIM-based authentication of non-SIM devices in accordance with one example set forth in the disclosure.

FIG. 1 illustrates one example of a communication environment 100 for SIM-based authentication of non-SIM devices. The communication environment 100 includes a Wi-Fi network 102 communicatively coupled to a server with SIM-based authentication of non-SIM devices 104 and a mobile SIM-operator server 106. The Wi-Fi network 102 may be any wireless local area network operating under the various IEEE 802.11 standards, or any other kind of wireless network. The network 102 also includes at least one Wi-Fi access point (AP) 108. The Wi-Fi AP 108 may include any suitable device capable of providing Wi-Fi connectivity to the network 102. However, the Wi-Fi network 102 is a paid network, meaning that a fee is normally charged every time network services are used.

The server with SIM-based authentication of non-SIM devices 104 acts as a proxy between the Wi-Fi network 102 and the mobile SIM-operator server 106. As such, the server 104 may be a gateway server, a web server, a cloud server, or any other server. Although the server 104 is illustrated as a single server, the server 104 could be implemented as a plurality of servers. Moreover, in some embodiments, the server 104 may be part of the Wi-Fi network 102.

The mobile SIM-operator server 106 may be part of or associated with a wireless communication subscriber network (e.g., a GSM network, a LTE network, etc.) operated by a mobile operator. As such, while not shown in FIG. 1, the server 106 may include various elements such as access network discovery & selection function (ANDSF), an authentication, authorization and accounting (AAA) server, a home location register/home subscriber server (HLR/HSS), a packet data network gateway (PDN-GW), etc. Moreover, multiple different mobile operators may be supported by the communication environment 100. Thus, in some embodiments, there may be a plurality of servers 106.

Communication between the Wi-Fi network 102 and the servers 104, 106 may occur over the Internet. Alternatively or additionally, communication may occur over dedicated or private links.

The communication environment 100 also includes a SIM-enabled device 110 and a non-SIM device 112. The devices 110 and 112 may be related (e.g., belong to the same user). For example, the SIM-enabled device 110 may be a smartphone of a user while the non-SIM device 112 may be the user's laptop. The user may wish to use one or both devices 110 and 112 to access the Wi-Fi network 102. The SIM-enabled device 110 can connect to the Wi-Fi network 102 through a standard SIM-based authentication (e.g., EAP-SIM or EAP-AKA) that uses information stored on the SIM card of the device 110 for authentication with the server 106. Once authenticated, the server 106 may grant the SIM-enabled device 110 access to the Wi-Fi network 102 for data services. However, standard SIM-based authentication is not possible for the non-SIM device 112 due to the lack of an active or functioning SIM card. To overcome this problem, the server 104 operates to emulate the non-SIM device 112 as the SIM-enabled device 110 to the server 106. In particular, the server 104 stores the credentials of the SIM-enabled device 110 and associates the credentials with the non-SIM device 112, effectively mapping the identity and data package of the SIM-enabled device 110 to the non-SIM device 112. In this manner, because the non-SIM device 112 appears as the SIM-enabled device 110 to the mobile SIM-operator server 106, the server 104 is able to convince the server 106 to grant the non-SIM device 112 access to the paid Wi-Fi network 102.

Figure 2:
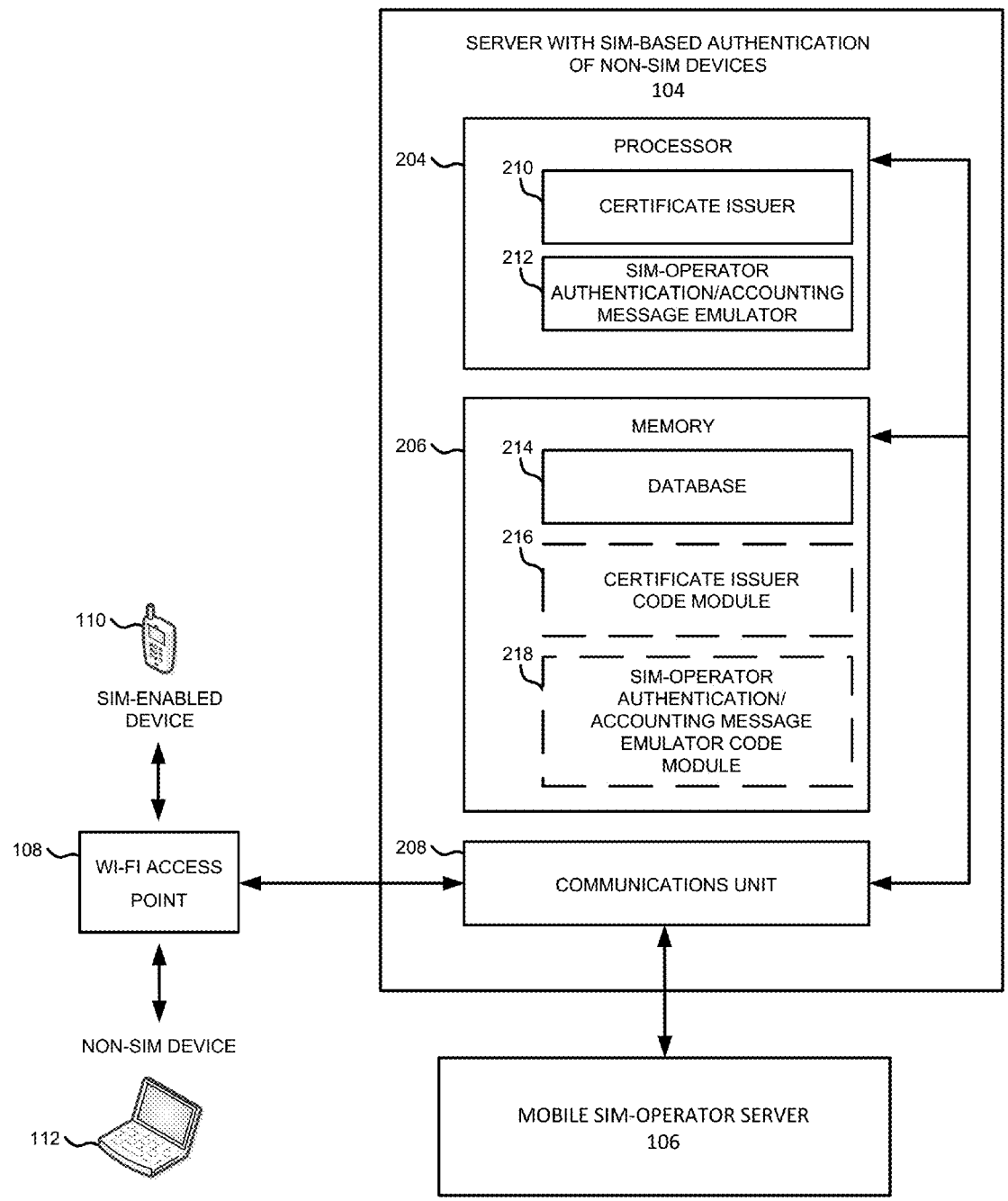
FIG. 2 is a block diagram illustrating one example of a server that implements SIM-based authentication of non-SIM devices in accordance with one example set forth in the disclosure.

Referring to FIG. 2, a more detailed functional block diagram of the server with SIM-based authentication of non-SIM devices 104 is shown. In this example, the server 104 includes a processor 204 coupled to a memory 206 and a communications unit 208.

The processor 204 may be a single processor or may have two or more processors carrying out all processing required for the operation of the server 104. In particular, the processor 204 includes a certificate issuer 210 and a SIM-operator authentication/accounting message emulator 212. During operation, the certificate issuer 210 generates a digital cryptographic certificate for the non-SIM device 112. The certificate may be based on the IEEE 802.1X format, or another suitable format. The generated certificate may be subsequently used to authenticate the non-SIM device 112 at the server 104. The generated certificate may be linked to the SIM-enabled device 110.

The generated certificate may include, among other things, a public key and a private key. The generated certificate including the public/private key pair may be provisioned or sent to the non-SIM device 112 via a secure and authenticated connection (e.g., by using EAP-TLS or EAP-TTLS). This ensures that the non-SIM device 112 will have sole possession of the private key. The public key, on the other hand, may be used to link the generated certificate to the SIM-enabled device 110.

The generated certificate can also be signed. For example, the generated certificate may be signed by a certificate chain that includes one of the common or trusted root certificate authorities (e.g., Verisign). The signed certificate (including both keys) may be sent to the non-SIM device 112 via a secure and authenticated connection. In another example, the generated certificate may be signed by a private key held by the server 104 but not necessarily connected via a certificate chain to a trusted root certificate authority.

To authenticate the non-SIM device 112 at the server 104, only the public portion of the certificate (i.e., not including the private key) sent to the non-SIM device 112 is presented or returned to the server 104. Moreover, the non-SIM device 112 may sign messages to the server 104 using the private key. After receiving the messages, the server 104 can use the appropriate public key to decrypt and validate the messages.

In some embodiments, it is contemplated that a third-party entity may generate and issue the certificate to the non-SIM device 112. In this scenario, the certificate issuer 210 may be a separate server or part of another server that is separate from the server 104. In fact, the certificate can even be generated by a user device (e.g., the non-SIM device 112), and then transmitted via a secure and authenticated connection to the server 104 or another certificate authority for signing. In other embodiments, the non-SIM device 112 may generate a public/private key pair and send the public key to the server 104.

Once the server 104 has authenticated the non-SIM device 112, the SIM-operator authentication/accounting message emulator 212 creates emulated messages for the non-SIM device 112 to pass on to the mobile SIM-operator server 106. This is done by using the credentials of the associated SIM-enabled device 110. For example, when the non-SIM device 112 wants access to the Wi-Fi network 102, the emulator 212 may modify an authentication message (e.g., RADIUS messages per RFC 2865) to the server 106 for the non-SIM device 112. The authentication message may be modified to include the credentials of the SIM-enabled device 110. Thus, when the mobile SIM-operator server 106 receives the modified authentication message, it will appear as though the message came from the SIM-enabled device 110. As another example, after the non-SIM device 112 has finished using the Wi-Fi network 102, the emulator 212 may modify an accounting message (e.g., RADIUS messages per RFC 2866) to the server 106 for the non-SIM device 112. The accounting message may be modified to include the credentials of the SIM-enabled device 110. Thus, when received by the mobile SIM-operator server 106, the modified accounting message may appear to indicate an amount of data used by the SIM-enabled device 110 on the Wi-Fi network 102, but in actuality, the data was used by the non-SIM device 112.

The memory 206 may include read only memory (ROM), random access memory (RAM), or any other suitable memory that stores processor instructions and executable code modules for the operation of the server 104. For example, the memory 206 may include a certificate issuer code module 216 and a SIM-operator authentication/accounting message emulator code module 218, that when executed, may respectively cause the issuer 210 and the emulator 212 to operate in the manner as described above. Moreover, the memory 206 includes a database 214 that stores various data used for the operation of the server 104. While the memory 206 is shown in FIG. 2 as separate from the processor 204, the memory 206 may be a part of the processor 204.

The communications unit 208 allows the server 104 to receive and transmit messages and data with the Wi-Fi AP 108 of the network 102 and the mobile SIM-operator server 106. Accordingly, while not shown in FIG. 2, the communications unit 208 may include various elements (e.g., antennas, receivers, transmitters, modulation/demodulation units, etc.) as known in the art.

Referring to FIG. 3, a more detailed block diagram of the database 214 is shown. In this example, the database 214 may be organized according to columns 302-308. The database 214 stores, as shown by column 302, identification (ID) information for an account. When the credentials of a SIM-enabled device (e.g., the SIM-enabled device 110) are first obtained by the server 104, an account may be created in the database 214. The account serves to catalog the SIM-enabled device in the database 214. The account may be identified by a unique account number, for example.

The database 214 stores, as shown by column 304, identification data for the SIM-enabled device, such as the obtained credentials and a phone number for the SIM-enabled device. The credentials may be obtained from the SIM card of the device and include information such as an international mobile subscriber identity (IMSI), an integrated circuit card identifier (ICCID), an authentication key (Ki), a local area identity (LAI), etc.

The database 214 stores, as shown in column 306, data for a non-SIM device certificate with a SIM-enabled device link. As described above, the certificate issuer 210 generates the non-SIM device certificate, which is used to authenticate a non-SIM device (e.g., the non-SIM device 112) at the server 104. More importantly, the non-SIM device certificate is linked to the SIM-enabled device. For example, the database 124 may store a certificate ID for the non-SIM device certificate in column 306. The certificate ID may be an alphanumeric number, a string of text, an email address, or any other suitable data type. The certificate ID may be tied to an account number in column 302 that relates to a SIM-enabled device in the database 214. Thus, the server 104 can search for the certificate ID in the database 214 to determine the SIM-enabled device and hence the credentials associated with the SIM-enabled device. In another embodiment, the database 214 may store a public key for non-SIM device certificate and tie the public key to the SIM-enabled device. Thereafter, the server 104 may search for the public key in the database 214 to determine the SIM-enabled device.

The database 214 stores, as shown in column 308, identification data for the non-SIM device, such as a device ID (e.g., a serial number, a model number, an IP address, etc.) associated with the non-SIM device. The non-SIM device may separately transmit the device ID to the sever 104, for example. A device identifier for the non-SIM device is not really needed to identify the non-SIM device as the generated non-SIM device certificate serves that purpose. However, the server 104 may still obtain and store a device identifier for the non-SIM device in the database 214 for easy device identification purposes.

Figure 4:
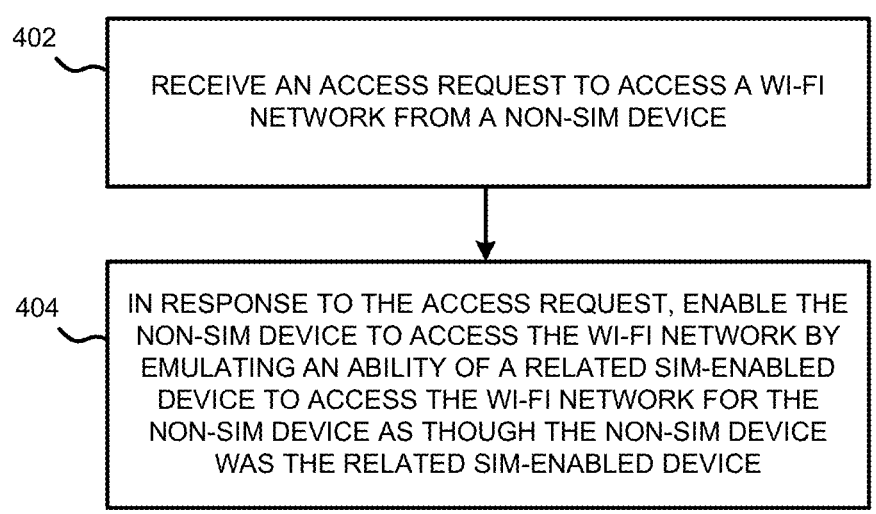
FIG. 4 is a flow chart illustrating one example of a method by a server that implements SIM-based authentication of non-SIM devices in accordance with one example set forth in the disclosure.

Referring to FIG. 4, an example method for the operation of the server with SIM-based authentication of non-SIM devices 104 will be described. As shown in block 402, the method includes receiving an access request to access a Wi-Fi network (e.g., the network 102) from a non-SIM device (e.g., the device 112). In one embodiment, receiving the access request comprises receiving a non-SIM device certificate with a SIM-enabled device link from the non-SIM device (see block 702 in FIG. 7). Alternatively or additionally, the access request may comprise a signed or encrypted message from the non-SIM device requesting access to the Wi-Fi network.

As shown in block 404, in response to the access request, the method includes enabling the non-SIM device to access the Wi-Fi network by emulating an ability of a related SIM-enabled device (e.g., the device 110) to access the Wi-Fi network for the non-SIM device as though the non-SIM device was the SIM-enabled device. Generally, enabling the non-SIM device to access the Wi-Fi network entails either granting the non-SIM device access to the Wi-Fi network, or denying the non-SIM device access to the Wi-Fi network. Moreover, emulating the ability of the related SIM-enabled device to access the Wi-Fi network for the non-SIM device comprises determining an association between identification data of the non-SIM device and identification data of the related SIM-enabled device.

In one embodiment, determining the association between the identification data of the non-SIM device and the related SIM-enabled device is based on the non-SIM device certificate with a SIM-enabled device link received from the non-SIM device as part of the access request. In particular, determining the association further comprises authenticating the non-SIM device based on the non-SIM device certificate with a SIM-enabled device link, and determining the related SIM-enabled device in response to the authentication of the non-SIM device certificate with a SIM-enabled device link (see blocks 704, 706 in FIG. 7).

In another embodiment, determining the association between the identification data of the non-SIM device and the related SIM-enabled device is based on obtaining a device ID of the non-SIM device, and searching a database (e.g., the database 214) for a related SIM-enabled device linked to that device ID.

Figure 5:
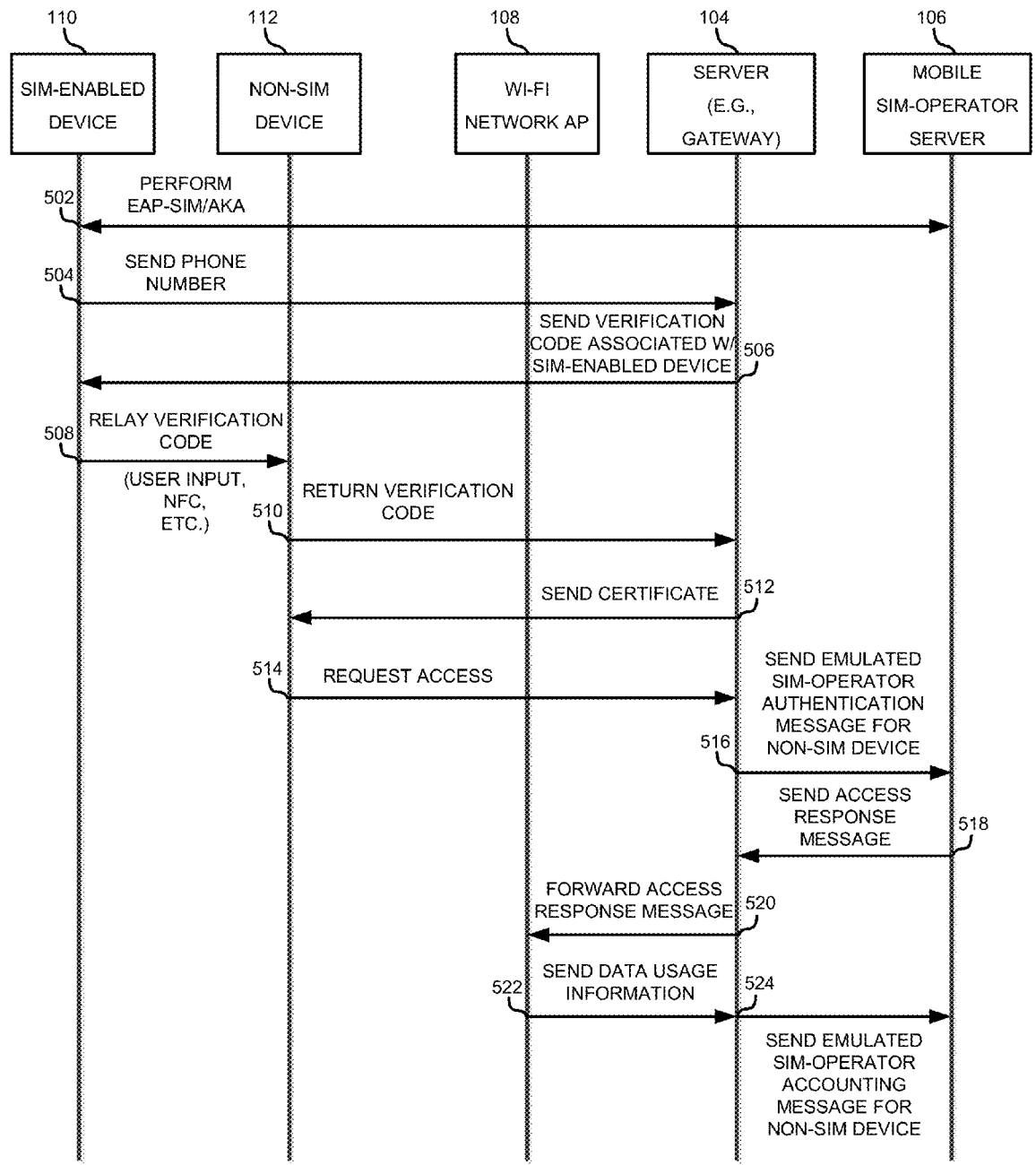
FIG. 5 is an example of communication flow among devices and servers in a system in accordance with one example set forth in the disclosure.
Figure 6:
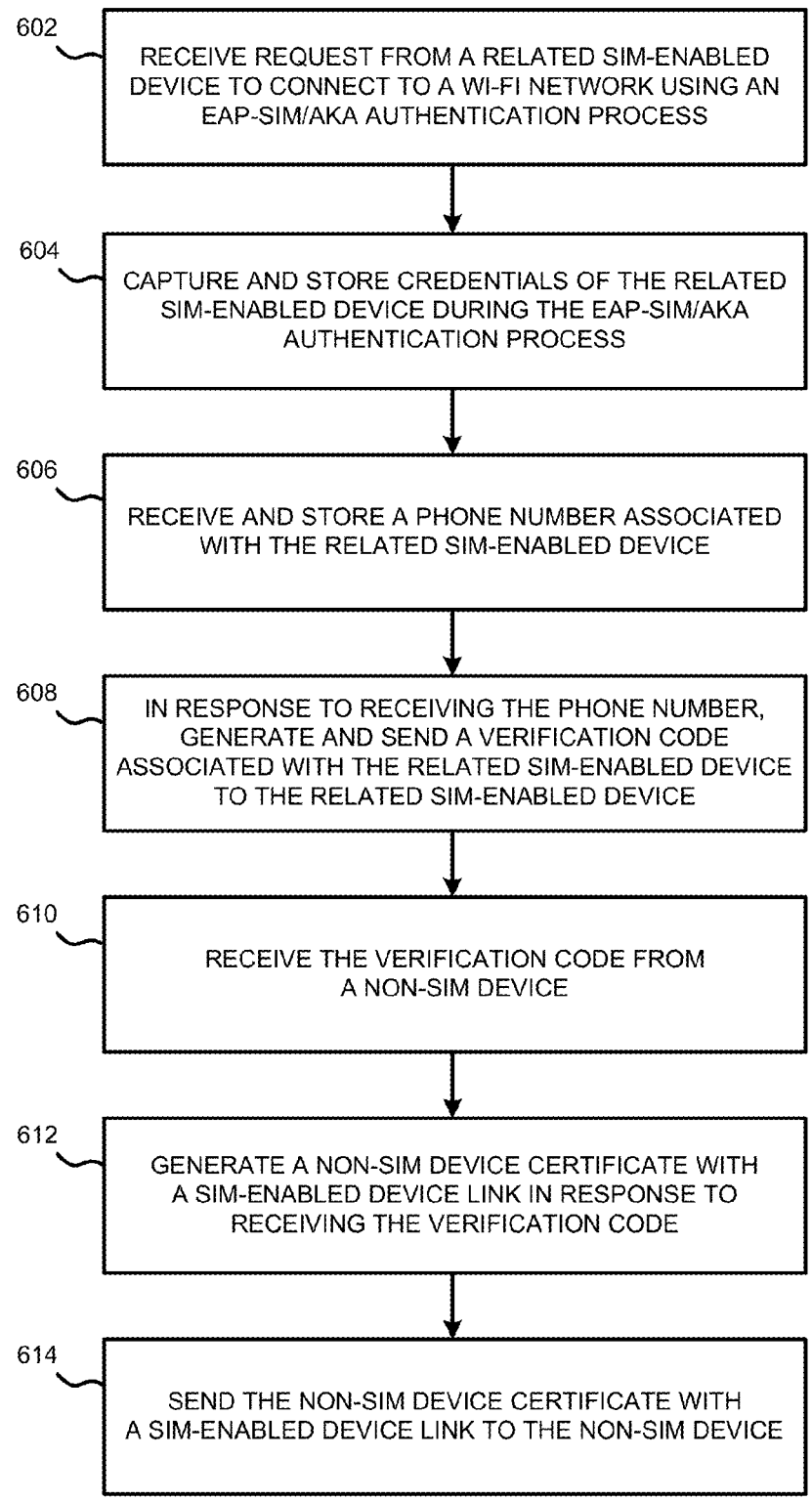
FIG. 6 is a flowchart illustrating one example of a method by a server that implements SIM-based authentication of non-SIM devices in accordance with one example set forth in the disclosure.
Figure 7:
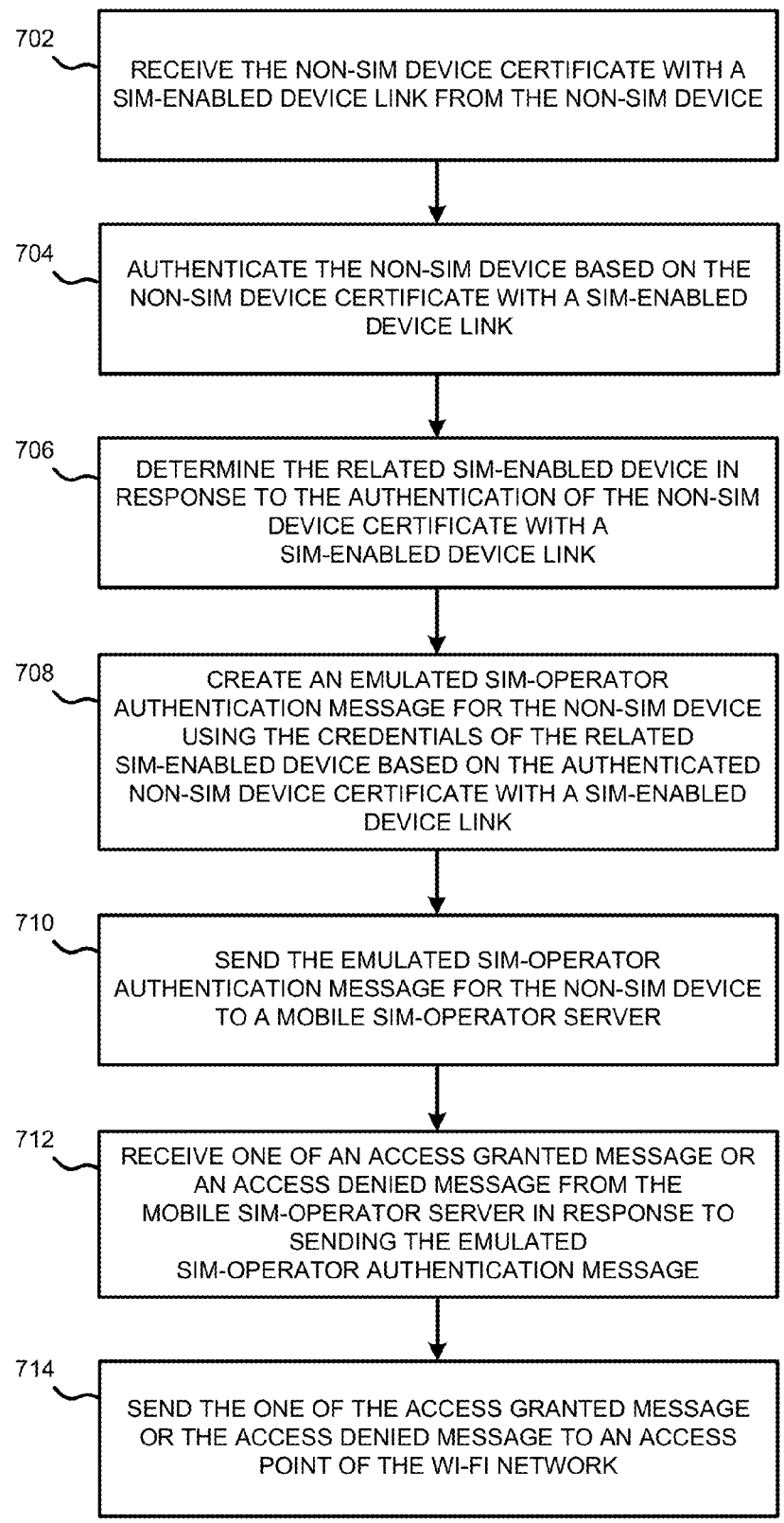
FIG. 7 is a flowchart illustrating one example of a method by a server that implements SIM-based authentication of non-SIM devices in accordance with one example set forth in the disclosure.

Referring to FIGS. 5, 6 and 7, a description of communications between the devices 110, 112 and servers 104, 106, and an example of the operation of the server 104 will be described. In this example, the server 104 (e.g., a gateway server) acts to emulate the non-SIM device 112 as the SIM-enabled device 110 to the mobile SIM-operator server 106. As such, no integration is required on behalf of the server 106 as the non-SIM device 112 is made to appear as the SIM-enabled device 110 in a way that is transparent to the server 106.

The SIM-enabled device 110 may be related to the non-SIM device 112 through, for example, a common owner or user. As shown by arrow 502, the related SIM-enabled device 110 may first connect to the Wi-Fi network 102 through a standard SIM-based authentication (e.g., EAP-SIM or EAP-AKA). This is done so that the server 104 can obtain the credentials of the SIM-enabled device 110. As shown in block 602 of FIG. 6, the server 104 may receive a request from the related SIM-enabled device 110 to access the Wi-Fi network 102 using an extensible authentication protocol (EAP) message. Subsequently, as shown in block 604, the server 104, acting as a proxy between the Wi-Fi AP 108 and the mobile SIM-operator server 106, may operate to capture the credentials of the related SIM-enabled device 110 during the EAP authentication process and store the credentials in memory (e.g., in the database 214).

To actually connect to the Wi-Fi network 102, the SIM-enabled device 110 may download an app or connect to a special webpage linked to a captive portal of the Wi-Fi network 102. Upon first connecting to the Wi-Fi network 102, the SIM-enabled device 110 (or any device for that matter) may be placed in a limited access state until the device is properly authenticated and given full access to the network services of the network 102.

Next, the related SIM-enabled device 110 may send a phone number associated with the device to the server 104 as shown by arrow 504. The server 104, in turn, receives the phone number associated with the related SIM-enabled device 110 and stores the phone number (e.g., in the database 214) as shown in block 606. Generally, a phone number that is associated with a SIM card can be changed over the air by a mobile operator. Thus, the phone number may not be stored locally on the SIM card to be captured by the server 104 during an EAP authentication process. As such, the phone number needs to be sent in a separate step. The phone number can be used as another piece of identification data for the SIM-enabled device 110. The SIM-enabled device 110 may transmit the phone number to the server 104 via the downloaded app or special webpage, for example.

The server 104 then generates a verification code associated with the related SIM-enabled device 110 in response to receiving the phone number, and communicates the verification code associated with the related SIM-enabled device 110 to the related SIM-enabled device 110 as shown by arrow 506 and block 608. The verification code can be sent to the device 110 via a text message, for example. As another example, the server 104 may send the verification code to be displayed in the downloaded app or special webpage.

Once the verification code has been received by the related SIM-enabled device 110, the verification code may be relayed to the non-SIM device 112 as shown by arrow 508. Relaying can occur via any suitable mechanism, such as manually (e.g., by user input) or automatically (e.g., by using near field communication (NFC) technology). Once the non-SIM device 112 receives the verification code, the device 112 can return the verification code to the server 104 as shown by arrow 510. The purpose of sending and then returning the verification code is to confirm that a sender or user of the phone number associated with the related SIM-enabled device 110 has actual control of the phone number.

The non-SIM device 112 may transmit the verification code back to the server 104 via the app or special webpage linked to the captive portal of the Wi-Fi network 102, for example.

The server 104 receives the verification code associated with the related SIM-enabled device 110 from the non-SIM device 112 as shown in block 610. The server 104 then generates a non-SIM device certificate with a SIM-enabled device link in response to receiving the verification code as shown in block 612. The non-SIM device certificate with a SIM-enabled device link is used by the server 104 to subsequently identify and authenticate the non-SIM device 112. In generating the non-SIM device certificate with a SIM-enabled device link, the server 104 may generate a public/private key pair. The server 104 may communicate the non-SIM device certificate with a SIM-enabled device link (including both keys) to the non-SIM device 112 as shown by arrow 512 and block 614. This may be done via a secure and authenticated connection. Alternatively, the server 104 may first provision the non-SIM device 112 with the private key via a secure and authenticated connection. The server 104 may then send the non-SIM device certificate with a SIM-enabled device link along with the public key to the non-SIM device 112.

As the verification code is associated with the related SIM-enabled device 110, the server 104 may link the generated certificate to the device 110. For example, the server 104 may associate the public key and/or a certificate ID of the non-SIM device certificate with a SIM-enabled device link with the related SIM-enabled device 110 in the database 214. Thus, when needed, the server 104 can search the public key and/or the certificate ID in the database 214 to determine the related SIM-enabled device 110. In another example, the non-SIM device certificate with a SIM-enabled device link may include an explicit field that references an identifier associated with the related SIM-enabled device 110. In this manner, a link to the related SIM-enabled device 110 is directly embedded in the non-SIM device certificate with a SIM-enabled device link.

After the non-SIM device 112 receives the non-SIM device certificate with a SIM-enabled device link, the non-SIM device 112 may wish to connect to the Wi-Fi network 102. Accordingly, the non-SIM device 112 may request access as shown by arrow 514. More particularly, the non-SIM device 112 may send the non-SIM device certificate with a SIM-enabled device link to the server 104. The server 104, in turn, may receive the non-SIM device certificate with a SIM-enabled device link from the non-SIM device 112 as shown in block 702. Here, block 702 is a particular embodiment of block 402 shown in FIG. 4, where receiving the access request includes receiving the non-SIM device certificate with a SIM-enabled device link. It should be noted that the non-SIM device 112 does not simply return the non-SIM device certificate with a SIM-enabled device link verbatim to the server 104. Instead, the non-SIM device 112 returns the public portion of the certificate (i.e., with the public key) as the private key is never transmitted anywhere by the non-SIM device 112.

The server 104 may subsequently authenticate the non-SIM device 112 based on the non-SIM device certificate with a SIM-enabled device link as shown in block 704. The server 104 may determine the related SIM-enabled device 110 in response to the authentication of the non-SIM device certificate with a SIM-enabled device link as shown in block 706. Here, blocks 704 and 706 form a particular embodiment of block 404 shown in FIG. 4, where emulating the ability of the related SIM-enabled device 110 for the non-SIM device 112 includes determining the association between the related SIM-enabled device 112 and the non-SIM device 110 based on authenticating the non-SIM device certificate with a SIM-enabled device link.

Afterward, the server 104 creates an emulated SIM-operator authentication message for the non-SIM device 112 using the credentials of the related SIM-enabled device 110 based on the authenticated non-SIM device certificate with a SIM-enabled device link as shown in block 708. The purpose of using the emulated SIM-operator authentication message is to make the server 106 believe that the non-SIM device 112 is the related SIM-enabled device 110. To this end, the server 104 may create the emulated SIM-operator authentication message by using the credentials and/or the phone number of the related SIM-enabled device 110.

The server 104 then communicates the emulated SIM-operator authentication message for the non-SIM device 112 to the mobile SIM-operator server 106 as shown by arrow 516 and block 710. Upon receiving the emulated SIM-operator authentication message, the mobile SIM-operator server 106 may think that the related SIM-enabled device 110 is the one trying to request access to the Wi-Fi network 102. Thus, the server 106 may send an access response message back to the server 104 as shown by arrow 518. Generally, the access response message may be in the form of an access granted message indicating that authorization has been given to fully access the network 102. However, in certain situations, if the server 106 has strict security controls, then the server 106 may not believe that the emulated SIM-operator authentication message came from the related SIM-enabled device 110. As a result, authentication at the server 106 would fail and the access response message will be in the form of an access denied message.

In any event, the server 104 receives the access response message for the non-SIM device 112, and communicates the access response message to the Wi-Fi AP 108 to enable the non-SIM device 112 to access the Wi-Fi network 102 as shown by arrow 520.

As discussed earlier with relation to FIG. 4, enabling a non-SIM device to access a Wi-Fi network entails either granting the non-SIM device access to the Wi-Fi network, or denying the non-SIM device access to the Wi-Fi network. Accordingly, the server 104 may receive one of an access granted message or an access denied message for the non-SIM device 112 in response to communicating the emulated SIM-operator authentication message to the mobile SIM-operator server 106 as shown in block 712. The server 104 may communicate the one of the access granted message or the access denied message to an access point 108 of the Wi-Fi network 102 as shown in block 714. In this manner, enabling the non-SIM device 112 to access the Wi-Fi network 102 comprises one of granting the non-SIM device 112 access to the Wi-Fi network 102 or denying the non-SIM device 112 access to the Wi-Fi network 102 based on the one of the access granted message or the access denied message.

If access is granted, the non-SIM device 112 may use the network 102 for data services (e.g., accessing the Internet). The amount of data used by the non-SIM device 112 on the network 102 may be logged by the Wi-Fi AP 108. This data usage information may be send to the server 104 as shown by arrow 522. The server 104, in turn, may receive the data usage information indicating the amount of data used by the non-SIM device 112 on the Wi-Fi network 102. The server 104 may then create an emulated SIM-operator accounting message for the non-SIM device 112. More particularly, the server 104 may create the emulated SIM-operator accounting message for the non-SIM device 112 using the data usage information and the credentials of the related SIM-enabled device 110 based on the authenticated non-SIM device certificate with a SIM-enabled device link. The server 104 may communicate the emulated SIM-operator accounting message to the mobile SIM-operator server 106 as shown by arrow 524. Again, the purpose of using the emulated SIM-operator accounting message is to make the server 106 believe that the amount of data was used by the related SIM-enabled device 110 instead of the non-SIM device 112. Accordingly, in response to receiving the emulated SIM-operator accounting message for the non-SIM device 112 from the server 104, the mobile SIM-operator server 106 may bill an account associated with the related SIM-enabled device 110 for the amount of data used by the non-SIM device 112 on the Wi-Fi network 102. For example, the server 106 may charge a monetary value for the amount of data used or debit the amount of data from the data package in the account. As an alternative, usage by the non-SIM device 112 on the Wi-Fi network 102 may be logged in terms of time spent on the network rather than an amount of data used.

Figure 8:
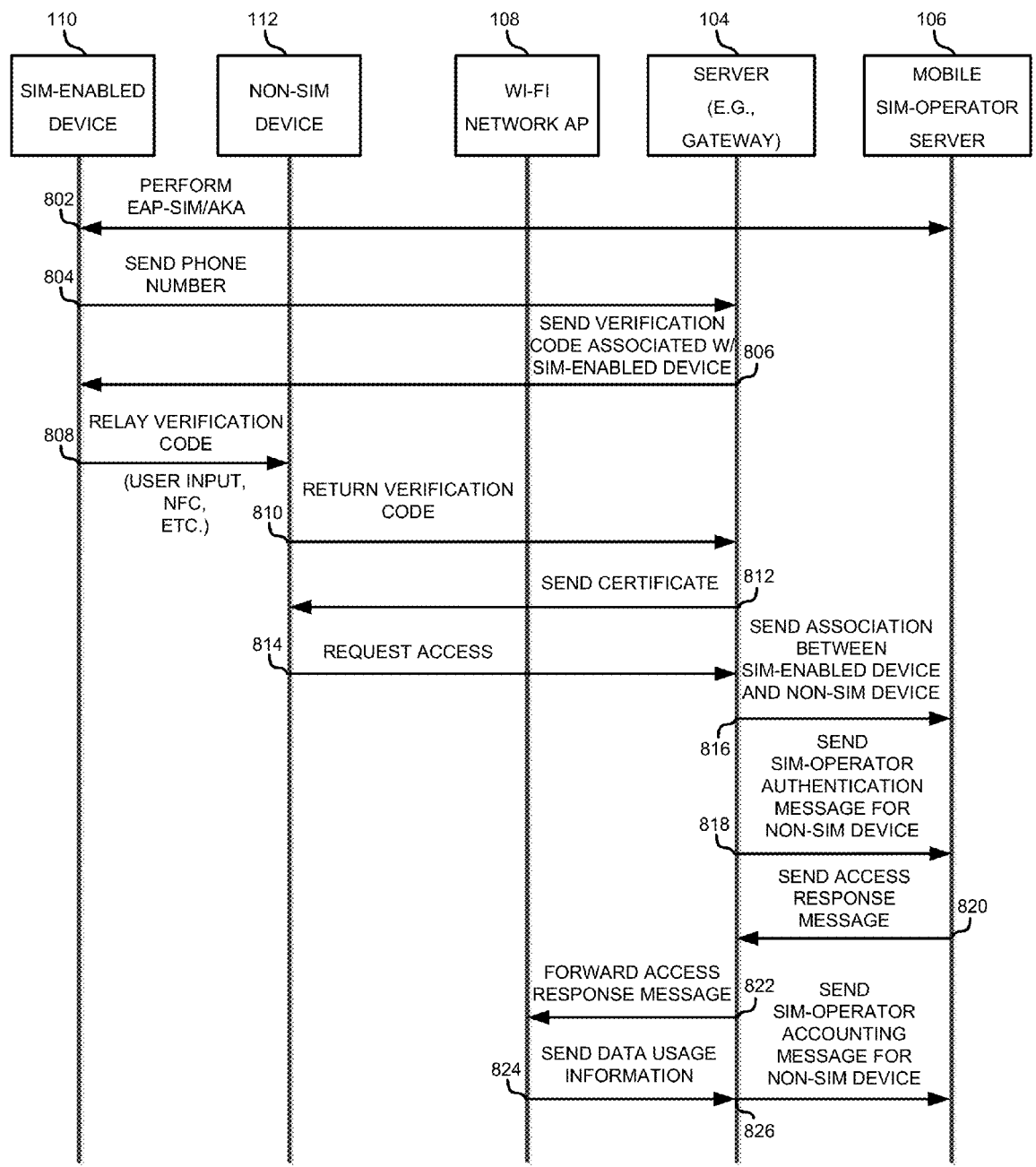
FIG. 8 is an example of communication flow among devices and servers in a system in accordance with one example set forth in the disclosure.
Figure 9:
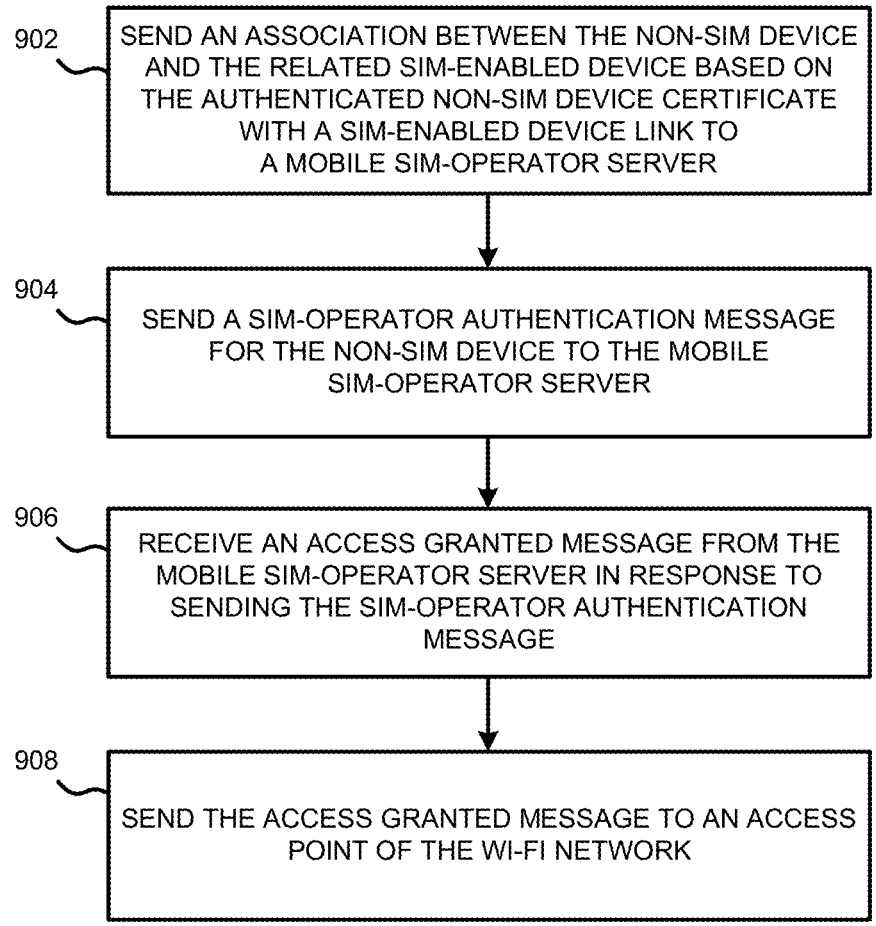
FIG. 9 is a flowchart illustrating one example of a method by a server that implements SIM-based authentication of non-SIM devices in accordance with one example set forth in the disclosure.

Referring to FIGS. 8 and 9, a description of communications between the devices 110, 112 and servers 104, 106, and another example of the operation of the server 104 will be described. In this example, the server 104 passes the association between the SIM-enabled device 110 and the non-SIM device 112 to the mobile SIM-operator server 106. The server 106 then creates an additional or dual identity for the non-SIM device 112. Here, the server 104 still emulates the ability of the related SIM-enabled device 110 for the non-SIM device 112 by determining the association between the related SIM-enabled device 112 and the non-SIM device 110. However, the server 104 no longer needs to "trick" the mobile SIM-operator server 106 by sending emulated messages for the non-SIM device 112 as the server 106 is fully aware of the existence of the non-SIM device 112. As such, in this example, integration is required on behalf of the server 106.

The initial steps of FIG. 8 are similar to those of FIG. 5. Briefly, as shown by arrows 802-812, the serve 104 obtains the credentials of the related SIM-enabled device 110 (802), receives a phone number associated with the device 110 (804), sends a verification code to the device 110 (806), receives the verification code from the non-SIM device 112 (810), and provisions a non-SIM device certificate with a SIM-enabled device link to the device 112 (812).

Subsequently, the non-SIM device 112 may wish to connect to the Wi-Fi network 102. As such, the non-SIM device 112 may request access as shown by arrow 814. More particularly, the non-SIM device 112 may send the non-SIM device certificate with a SIM-enabled device link to the server 104. The server 104 may authenticate the non-SIM device 112 based on the non-SIM device certificate with a SIM-enabled device link, and determine the related SIM-enabled device 110 in response to the authentication of the non-SIM device certificate with a SIM-enabled device link. In other words, the server 104 may still emulate the ability of the related SIM-enabled device 110 for the non-SIM device 112 by determining the association between the related SIM-enabled device 112 and the non-SIM device 110.

Next, the server 104 communicates the association to the mobile SIM-operator server 106 as shown by arrow 816 and block 902. The association may be, for example, a string of text that includes a device ID (e.g., a serial number) for the non-SIM device 112 followed by an identifier for the related SIM-enabled device 110 (e.g., IMSI, a phone number, etc.) indicating that the device 112 is associated with the device 110. In response to receiving the association, the server 106 may link the non-SIM device 112 to an account associated with the related SIM-enabled device 110.

Accordingly, for non-SIM device 112 to access the Wi-Fi network 102, the server 104 communicates a SIM-operator authentication message for the non-SIM device 112 to the mobile SIM-operator server 106 as shown by arrow 818 and block 904. Upon receiving the SIM-operator authentication message for the non-SIM device 112, the server 106 may send an access response message to the server 104 as shown by arrow 820. In turn, the server 104 may communicate the access response message to the Wi-Fi AP 108 as shown by arrow 822. The access response message may be an access granted message indicating that authorization has been given to the non-SIM device 112 to access the Wi-Fi network 102. Thus, the server 104 receives the access granted message in response to communicating the SIM-operator authentication message to the mobile SIM-operator server 106 as shown by block 906. The server 104 also communicates the access granted message to an access point 108 of the Wi-Fi network 102 as shown in block 908. In this regard, enabling the non-SIM device 112 to access the Wi-Fi network 102 comprises granting the non-SIM device 112 access to the Wi-Fi network 102 based on the access granted message.

The non-SIM device 112 may use the network 102 for data services. The amount of data used by the non-SIM device 112 on the network 102 may be logged by the Wi-Fi AP 108. This data usage information may be send to the server 104 as shown by arrow 824. As such, the server 104 may receive the data usage information indicating the amount of data used by the non-SIM device 112 on the Wi-Fi network 102. The server 104 may communicate a SIM-operator accounting message for the non-SIM device 112 using the data usage information to the mobile SIM-operator server 106 as shown by arrow 826. Accordingly, the server 106 may receive the SIM-operator accounting message for the non-SIM device 112, and bill the account associated with the related SIM-enabled device 110 for the amount of data used by the non-SIM device 112 on the Wi-Fi network 102.

Figure 10:
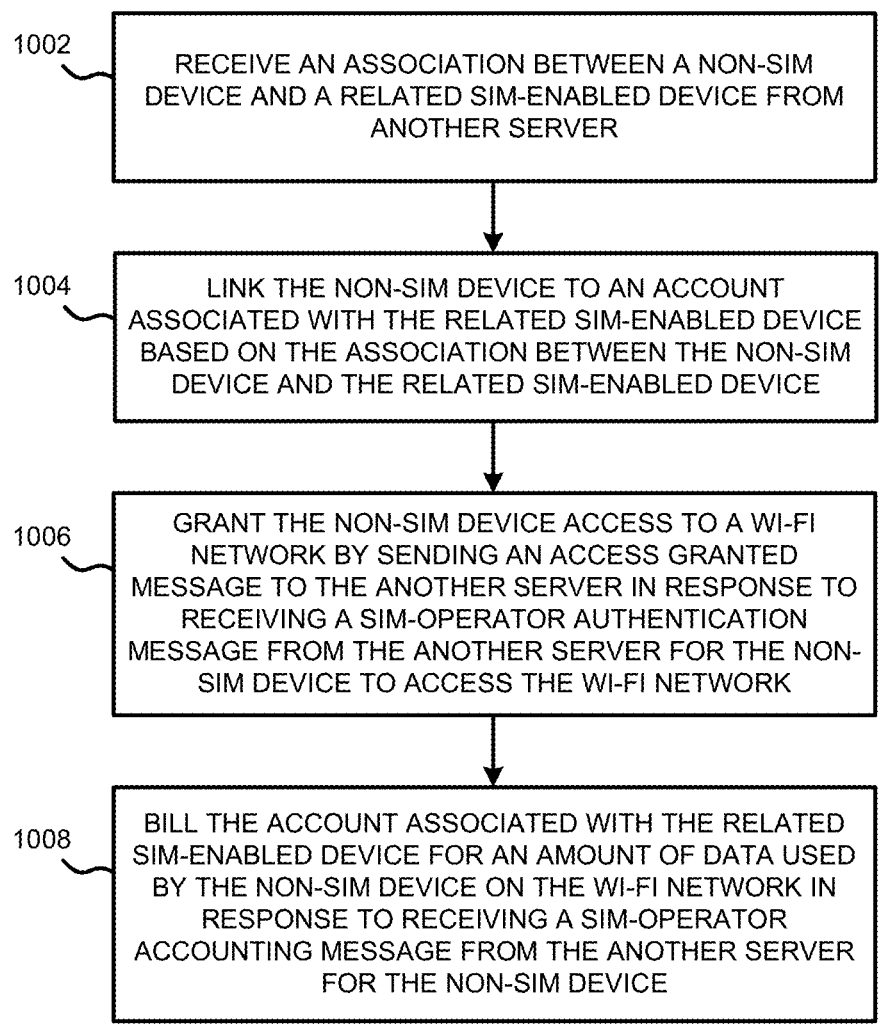
FIG. 10 is a flowchart illustrating one example of a method by a server that implements SIM-based authentication of non-SIM devices in accordance with one example set forth in the disclosure.

Referring also to FIG. 10, an example method for the operation of the mobile SIM-operator server 106 will be described. As shown in block 1002, the method includes receiving an association between a non-SIM device 112 and a related SIM-enabled device 110 from another server 104.

As shown in block 1004, the method includes linking the non-SIM device 112 to an account associated with the related SIM-enabled device 110 based on the received association between the non-SIM device 112 and the related SIM-enabled device 110. This linking can be accomplished in any suitable manner. For example, a single unified account may be preferred, and as a result, the non-SIM device 112 is simply referenced to the account associated with the related SIM-enabled device 110. As another example, the non-SIM device 112 may be referenced to a "child" account that is attached to a "parent" account associated with the related SIM-enabled device 110. In this scenario, billing in the child account may be reflected in the parent account. Alternatively, billing in the parent account could be transferred to the child account. As a further example, a new or separate account may be created for the non-SIM device 112. Accordingly, billing in this account may be copied over to the account associated with the related SIM-enabled device 110.

As shown in block 1006, the method includes granting the non-SIM device 112 access to a Wi-Fi network 102 by communicating an access granted message to the another server 104 in response to receiving a SIM-operator authentication message from the another server 104 for the non-SIM device 112 to access the Wi-Fi network 102. Here, because the server 106 knows the non-SIM device 112, the server 106 can interpret the SIM-operator authentication message to identify and authenticate the non-SIM device 112, which results in the server 106 granting permission to the non-SIM device 112 to access the network 102.

As shown in block 1008, the method includes billing the account associated with the related SIM-enabled device 110 for an amount of data used by the non-SIM device 112 on the Wi-Fi network 102 in response to receiving a SIM-operator accounting message from the another server 104 for the non-SIM device 112. Again, because the server 106 knows the non-SIM device 112, the server 106 can interpret the SIM-operator accounting message and bill the account associated with the related SIM-enabled device 110, which is linked to the non-SIM device 112.

In addition to providing information for billing purposes, the SIM-operator accounting message can also be used to control access to the Wi-Fi network 102. For example, in response to learning that the non-SIM device 112 has consumed more than a certain amount of data, the server 106 may sent a message to the server 104 instructing that further access to the network 102 should be restricted or terminated.

In various embodiments, executable suitable instructions may be stored on a non-transitory computer readable storage medium, where the executable instructions are executable by one or more processors to cause the one or more processors to perform the actions described herein. Referring back to FIG. 2, the memory 206 may store executable instructions, including the code modules 216 and 218, to be executed by the server 104. The memory 206 may be any suitable memory, such as RAM, non-volatile memory (e.g., ROM, flash memory, EPROM, EEPROM, etc.), a disk storage device, or any other suitable memory that may store executable instructions. Some or all of this functionality may also be implemented in any other suitable manner such as, but not limited to, a software implementation including, for example, a driver implementation, a firmware implementation, a hardware implementation, or any suitable combination of the example implementations described above.

In situations in which the methods and systems discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics (age, gender, profession, etc.), social actions or activities, a user's preferences, content created or submitted by a user, a user's current geographic location, etc.). A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or a user's geographic location may be generalized to a larger region so that a particular location of a user cannot be determined.

In the preceding detailed description, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein

What is claimed is:

1. A method by a server for subscriber identity module (SIM)-based authentication of a non-SIM device, the method comprising:
   receiving, by the server, an access request to access a wireless network from the non-SIM device; and
   in response to the access request, enabling, by the server, the non-SIM device to access the wireless network by emulating an ability of a related SIM-enabled device to access the wireless network for the non-SIM device to a mobile SIM-operator, wherein emulating the ability of the related SIM-enabled device to access the wireless network for the non-SIM device comprises making communication between the non-SIM device and the mobile SIM-operator to access the wireless network appear as though the communication to access the wireless network was between the related SIM-enabled device and the mobile SIM-operator.

2. The method of claim 1, wherein emulating the ability of the related SIM-enabled device to access the wireless network for the non-SIM device comprises determining an association between identification data of the non-SIM device and identification data of the related SIM-enabled device.

3. The method of claim 2, wherein receiving the access request comprises receiving a non-SIM device certificate with a SIM-enabled device link from the non-SIM device.

4. The method of claim 3, wherein determining the association further comprises authenticating the non-SIM device based on the non-SIM device certificate with a SIM-enabled device link, and determining the related SIM-enabled device in response to the authentication of the non-SIM device certificate with a SIM-enabled device link.

5. The method of claim 4, further comprising:
creating, by the server, an emulated SIM-operator authentication message for the non-SIM device using credentials of the related SIM-enabled device based on the authenticated non-SIM device certificate with a SIM-enabled device link;
communicating, by the server, the emulated SIM-operator authentication message to a mobile SIM-operator server;
receiving, by the server, one of an access granted message or an access denied message for the non-SIM device in response to communicating the emulated SIM-operator authentication message to the mobile SIM-operator server;
communicating, by the server, the one of the access granted message or the access denied message to an access point of the wireless network; and
wherein enabling the non-SIM device to access the wireless network comprises one of granting the non-SIM device access to the wireless network or denying the non-SIM device access to the wireless network based on the one of the access granted message or the access denied message.

6. The method of claim 4, further comprising:
receiving, by the server, data usage information indicating an amount of data used by the non-SIM device on the wireless network;
creating, by the server, an emulated SIM-operator accounting message for the non-SIM device using the data usage information and the credentials of the related SIM-enabled device based on the authenticated non-SIM device certificate with a SIM-enabled device link; and
communicating, by the server, the emulated SIM-operator accounting message to a mobile SIM-operator server.

7. The method of claim 6, further comprising:
in response to receiving the emulated SIM-operator accounting message for the non-SIM device from the server, billing, by the mobile SIM-operator server, an account associated with the related SIM-enabled device for the amount of data used by the non-SIM device on the wireless network.

8. The method of claim 2, further comprising communicating, by the server, the association to a mobile SIM-operator server.

9. The method of claim 8, further comprising:
communicating, by the server, a SIM-operator authentication message for the non-SIM device to the mobile SIM-operator server;
receiving, by the server, an access granted message in response to communicating the SIM-operator authentication message to the mobile SIM-operator server;
communicating, by the server, the access granted message to an access point of the wireless network; and
wherein enabling the non-SIM device to access the wireless network comprises granting the non-SIM device access to the wireless network based on the access granted message.

10. The method of claim 8, further comprising:
receiving, by the server, data usage information indicating an amount of data used by the non-SIM device on the wireless network;
communicating, by the server, a SIM-operator accounting message for the non-SIM device using the data usage information to the mobile SIM-operator server.

11. The method of claim 10, further comprising:
in response to receiving the association, linking, by the mobile SIM-operator server, the non-SIM device to an account associated with the related SIM-enabled device; and
billing, by the mobile SIM-operator server, the account associated with the related SIM-enabled device for the amount of data used by the non-SIM device on the wireless network.

12. The method of claim 1, further comprising:
receiving, by the server, a phone number associated with the related SIM-enabled device;
generating, by the server, a verification code associated with the related SIM-enabled device in response to receiving the phone number;
communicating, by the server, the verification code associated with the related SIM-enabled device to the related SIM-enabled device;
receiving, by the server, the verification code associated with the related SIM-enabled device from the non-SIM device;
generating, by the server, the non-SIM device certificate with a SIM-enabled device link in response to receiving the verification code; and
communicating, by the server, the non-SIM device certificate with a SIM-enabled device link to the non-SIM device.

13. A server communicatively coupled to a wireless network, the server comprising:
a processor, coupled to a communications unit, configured to cause the server to:
receive, via the communications unit, an access request to access the wireless network from a non-subscriber identity module (SIM) device; and
in response to the access request, enable the non-SIM device to access the wireless network by emulating an ability of a related SIM-enabled device to access the wireless network for the non-SIM device to a mobile SIM-operator, wherein emulating the ability of the related SIM-enabled device to access the wireless network for the non-SIM device comprises making communication between the non-SIM device and the mobile SIM-operator to access the wireless network appear as though the communication to access the wireless network was between the related SIM-enabled device and the mobile SIM-operator.

14. The server of claim 13, wherein emulating the ability of the related SIM-enabled device to access the wireless network for the non-SIM device comprises determining an association between identification data of the non-SIM device and identification data of the related SIM-enabled device.

15. The server of claim 14, wherein receiving the access request comprises receiving a non-SIM device certificate with a SIM-enabled device link from the non-SIM device.

16. The server of claim 15, wherein determining the association further comprises authenticating the non-SIM device based on the non-SIM device certificate with a SIM-enabled device link, and determining the related SIM-enabled device in response to the authentication of the non-SIM device certificate with a SIM-enabled device link.

17. The server of claim 16, wherein the processor is further configured to cause the server:
create an emulated SIM-operator authentication message for the non-SIM device using credentials of the related SIM-enabled device based on the authenticated non-SIM device certificate with a SIM-enabled device link;

communicate, via the communications unit, the emulated SIM-operator authentication message to a mobile SIM-operator server;

receive, via the communications unit, one of an access granted message or an access denied message for the non-SIM device in response to communicating the emulated SIM-operator authentication message to the mobile SIM-operator server;

communicate, via the communications unit, the one of the access granted message or the access denied message to an access point of the wireless network; and wherein enabling the non-SIM device to access the wireless network comprises one of granting the non-SIM device access to the wireless network or denying the non-SIM device access to the wireless network based on the one of the access granted message or the access denied message.

18. The server of claim 17, wherein the processor is further configured to cause the server to:

receive, via the communications unit, a phone number associated with the related SIM-enabled device;

generate a verification code associated with the related SIM-enabled device in response to receiving the phone number;

communicate, via the communications unit, the verification code associated with the related SIM-enabled device to the related SIM-enabled device;

receive, via the communications unit, the verification code associated with the related SIM-enabled device from the non-SIM device;

generate the non-SIM device certificate with a SIM-enabled device link in response to receiving the verification code; and communicate, via the communications unit, the non-SIM device certificate with a SIM-enabled device link to the non-SIM device.

19. The server of claim 16, wherein the processor is further configured to cause the server to:

receive, via the communications unit, data usage information indicating an amount of data used by the non-SIM device on the wireless network;

create an emulated SIM-operator accounting message for the non-SIM device using the data usage information and the credentials of the related SIM-enabled device based on the authenticated non-SIM device certificate with a SIM-enabled device link; and communicate, via the communications unit, the emulated SIM-operator accounting message to a mobile SIM-operator server.

20. A method by a server to authenticate a non-subscriber identity module (SIM) device, the method comprising:

receiving, by the server, an association between the non-SIM device and a related SIM-enabled device from another server;

linking, by the server, the non-SIM device to an account associated with the related SIM-enabled device based on the received association between the non-SIM device and the related SIM-enabled device;

granting, by the server, the non-SIM device access to a wireless network by communicating an access granted message to the another server in response to receiving a SIM-operator authentication message from the another server for the non-SIM device to access the wireless network; and billing, by the server, the account associated with the related SIM-enabled device for an amount of data used by the non-SIM device on the wireless network in response to receiving a SIM-operator accounting message from the another server for the non-SIM device.

* * * * *